United States Patent
Gandolfo

(10) Patent No.: US 11,126,995 B2
(45) Date of Patent: Sep. 21, 2021

(54) RADIO FREQUENCY-BASED SELF-ENROLMENT AND DATA EXCHANGE METHODS FOR BIOMETRIC SMART CARDS AND NON-SELF-POWERED AUTHENTICATION DEVICES

(71) Applicant: Pierre T. Gandolfo, Le Cannet (FR)

(72) Inventor: Pierre T. Gandolfo, Le Cannet (FR)

( * ) Notice: Subject to any disclaimer, the term of this patent is extended or adjusted under 35 U.S.C. 154(b) by 0 days.

(21) Appl. No.: 16/245,584

(22) Filed: Jan. 11, 2019

(65) Prior Publication Data

US 2020/0051061 A1 Feb. 13, 2020

Related U.S. Application Data

(60) Provisional application No. 62/717,940, filed on Aug. 13, 2018.

(51) Int. Cl.
| | |
|---|---|
| *G06Q 20/34* | (2012.01) |
| *G06Q 20/38* | (2012.01) |
| *H02J 50/23* | (2016.01) |
| *G06F 21/32* | (2013.01) |
| *H02J 50/27* | (2016.01) |
| *G06Q 20/40* | (2012.01) |

(52) U.S. Cl.
CPC .......... *G06Q 20/341* (2013.01); *G06F 21/32* (2013.01); *G06Q 20/38215* (2013.01); *G06Q 20/40145* (2013.01); *H02J 50/23* (2016.02); *H02J 50/27* (2016.02)

(58) Field of Classification Search
CPC .... G06Q 20/34; G06Q 20/341; G06Q 20/347; G06Q 20/352; G06Q 20/40145; G06K 19/07; G06K 19/0701; G06K 19/0702; G06K 19/0707–0709; G06K 19/071; G06K 19/0715; G06K 19/0716; G06K 19/0718; G06K 19/0723; G06K 19/0724; G06K 19/0726; G06K 19/07749; G06K 19/07786; G06K 19/07794; G07F 7/0806; G07F 7/0813; G07F 7/082; G07F 7/0826; G07F 7/0833; G07F 7/084; G07F 7/086
See application file for complete search history.

(56) References Cited

U.S. PATENT DOCUMENTS

| | | | | |
|---|---|---|---|---|
| 6,508,400 B1 * | 1/2003 | Ishifuji | ................ | G06Q 20/341 235/382 |
| 7,946,501 B2 * | 5/2011 | Borracci | .............. | G06Q 20/204 235/492 |
| 2004/0129787 A1 * | 7/2004 | Saito | ...................... | G06K 19/07 235/492 |

(Continued)

*Primary Examiner* — Thien M Le
*Assistant Examiner* — April A Taylor

(57) ABSTRACT

The present invention relates to transfer methods of wireless power to non-self-powered biometric authentication devices through far-field radio waves coming from a nearby self-powered radio frequency device. By default, the non-self-powered biometric authentication device of the invention is made of a far-field radio microwave antenna, an antenna tuner, a RF-to-DC power rectifier and power converter functions. The transfer methods of wireless power to non-self-powered biometric authentication devices of the invention are particularly well-suited for self-enrollment of one user's identity on biometric smart cards but can also be applied for subsequent data exchange such as peer-to-peer money transfer.

6 Claims, 4 Drawing Sheets

(56) References Cited

U.S. PATENT DOCUMENTS

| | | | |
|---|---|---|---|
| 2007/0069010 A1* | 3/2007 | Mestres | G06K 19/07354 235/380 |
| 2008/0223925 A1* | 9/2008 | Saito | G07C 9/257 235/380 |
| 2010/0039234 A1* | 2/2010 | Soliven | H04B 5/02 340/10.1 |
| 2014/0291405 A1* | 10/2014 | Harkes | G06K 19/07749 235/492 |
| 2017/0206386 A1* | 7/2017 | Meindl | H04B 5/0037 |
| 2018/0268274 A1* | 9/2018 | Lowe | G06K 19/0709 |
| 2019/0286805 A1* | 9/2019 | Law | G06F 21/34 |
| 2020/0006988 A1* | 1/2020 | Leabman | H02J 50/20 |

\* cited by examiner

FIG. 3a (Front Page View)

RADIO FREQUENCY-BASED SELF-ENROLMENT AND DATA EXCHANGE METHODS FOR BIOMETRIC SMART CARDS AND NON-SELF-POWERED AUTHENTICATION DEVICES

CROSS-REFERENCE TO RELATED APPLICATIONS

The present document claims the benefits (i.e. provisional application for patent) of the earlier filing date of patent application No. U.S. 62/717,940 (confirmation number 7979, EFS ID 33444530) filed on Aug. 13, 2018, and entitled "Radio frequency-based self-enrollment method for biometric smart cards", the contents of which are incorporated by reference.

STATEMENT REGARDING FEDERALLY SPONSORED RESEARCH OR DEVELOPMENT

Non-applicable

REFERENCE TO SEQUENCE LISTING, A TABLE, OR A COMPUTER PROGRAM LISTING COMPACT DISC APPENDIX

Non-applicable.

BACKGROUND OF THE INVENTION

The present invention relates to the transfer of wireless power to biometric smart cards primarily and to other non-self-powered biometric authentication devices more generally, for both identity self-enrollment and data exchange (e.g. peer-to-peer money transfer), through far-field radio waves coming from a nearby self-powered radio frequency device (e.g. Bluetooth/Wi-Fi signal in the 2.4 GHz/5.8 GHz bands, mobile phone frequency signal).

As illustrated by FIG. 1, a biometric smart card (101) is a smart card, which is either contact-based, contactless or dual-mode with an optional embedded loop antenna (104) within the card inlay, and further coming with a fingerprint sensor (103) in order to authenticate the end-user in lieu of entering a pin code. The captured fingerprint is then compared with the template version stored in the securely-protected memory area (e.g. secure element or secure flash memory) of the micro-chip module (102) and upon matching, the end-user is authenticated. As such the entire authentication process is performed entirely within the biometric smart card.

In order to be authenticated, the end-user first needs to capture and store his fingerprint template on the securely-protected memory area of the biometric smart card. This process is called enrollment and requires power for fingerprint sensor scanning, minutiae template extraction and storage.

The problem with current enrollment methods is that they a not convenient, which is a main barrier to entry for adoption. End-user is either being forced to go to banks or enrollment centers to register his/her fingerprints, which implies a physical displacement, or to receive, as illustrated by FIG. 2, a one-time-use battery-powered sleeve (201) with an open slot (202), which powers the biometric smart card (101) during the enrollment procedure; or to have in his/her possession a one-time RFID reader to power the biometric smart card through the embedded 13.56 MHz loop antenna (104) within the card inlay via near-field inductive coupling.

The hereby self-enrollment methods propose to remove those inconvenience-related barriers to adoption while enabling additional end-user scenario (e.g. peer-to-peer money transfer) by wirelessly powering the biometric smart card through far-field radio waves coming from a nearby self-powered radio frequency device (e.g. Bluetooth with de-whitener sequence so as to operate on a fixed frequency, Wi-Fi smartphone mobile hotspot function, Wi-Fi home/office access point, mobile phone frequency signal), thus requiring neither an additional piece of hardware equipment nor physical displacement of the end-user.

BRIEF SUMMARY OF THE INVENTION

Consistent with the title of this section, only a brief description of selected features of the present invention is now presented. A more complete description of the present invention is the subject of this entire document.

The self-enrollment and data exchange methods according to the invention enable to suppress all aforementioned drawbacks. A feature of the biometric smart card according to the invention is to reuse the existing embedded loop antenna within the card inlay but tuned to a microwave frequency (e.g. 2.4 GHz ISM/5.8 GHz UNII frequency bands) while adding a Power Management Integrated Circuit (PMIC) functional block, including impedance-matching elements, RF (Radio Frequency)-to-DC power rectifier and power conversion functions (e.g. boost/buck switching converter), within either the fingerprint sensor or micro-chip module.

Another feature of the biometric smart card according to the invention is that the existing embedded loop antenna now tuned to a microwave frequency is connected to the PMIC block either through a wire connection or via inductive coupling thanks to the addition of a smaller loop antenna being integrated within either the fingerprint sensor or micro-chip module.

In other embodiments of the present invention, the biometric smart card according to the invention may only include the smaller loop antenna within either the fingerprint sensor or micro-chip module.

The above methods will not only allow to realize identity self-enrollment by wirelessly powering the biometric smart card through far-field radio waves coming from a nearby self-powered radio frequency device (e.g. Bluetooth with de-whitener sequence so as to operate on a fixed frequency, Wi-Fi smartphone mobile hotspot function, Wi-Fi home/office access point, mobile phone frequency signal) but also to enable additional end-user scenarios such as data exchange between two non-self-powered biometric authentication devices (e.g. peer-to-peer money transfer between e-wallets).

As such, the Microsystem according to the invention is particularly well-suited for biometric smart cards but can also be used with other biometric authentication devices not being self-powered.

BRIEF DESCRIPTION OF THE SEVERAL VIEWS OF THE DRAWING

A more complete appreciation of the present invention and many of the attendant advantages thereof will be readily obtained as the same becomes better understood by reference to the following detailed description when considered in connection with the accompanying drawings. In these drawings like reference numerals designate identical or corresponding parts throughout the several views.

FIG. 3*a* cross-section view shows an embodiment of the biometric smart card according to the invention, with either the micro-chip module or fingerprint sensor, embedding the microwave frequency-tuned PMIC block, line-connected to the loop antenna of the card inlay;

DETAILED DESCRIPTION OF THE INVENTION

Figure 1:
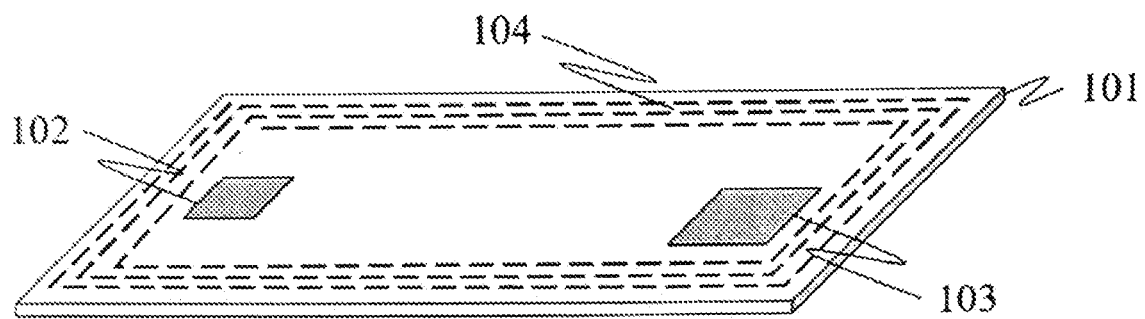
FIG. 1 shows, in a three-dimensional space, a biometric smart card with a micro-chip module, a fingerprint sensor and optional loop antenna implemented within the card inlay.
Figure 2:
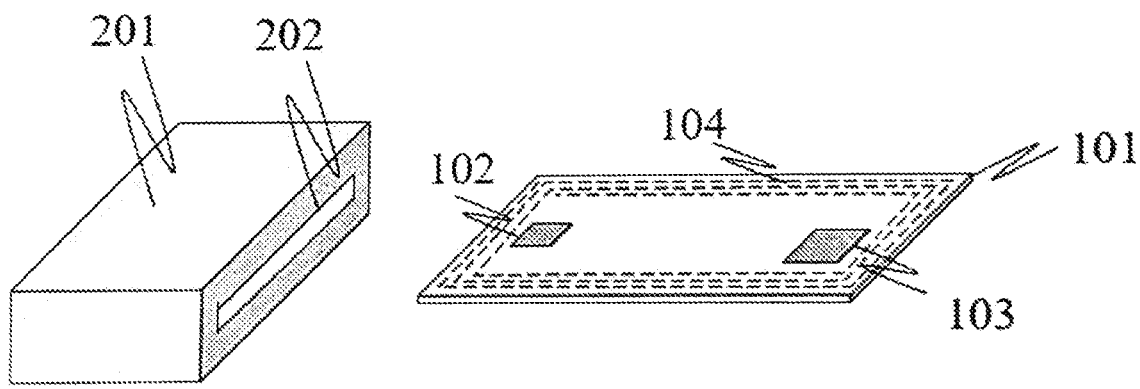
FIG. 2 illustrates, in a three-dimensional space, the battery-powered sleeve with open slot used to power biometric smart card during enrollment.

Referring to those drawings and more specifically to FIG. 3*a*, either the micro-chip module or fingerprint sensor (310) active silicon die (308) of the biometric smart card (101) comes equipped with a microwave frequency-tuned PMIC block (305), integrating impedance-matching elements, RF-to-DC power rectifier and power conversion functions. The active silicon die is attached to the top substrate (304), covered by glob top and/or epoxy mold compound (307) for mechanical protection, and dropped within a cavity (302) of the card body (303) typically done through mechanical or laser milling.

In a preferred embodiment of the present invention, the microwave frequency-tuned PMIC block (305) is connected to the loop antenna (104) of the card inlay (301) through both wirebond connection (306) and the top substrate (304) line connectors.

Figure 3B:
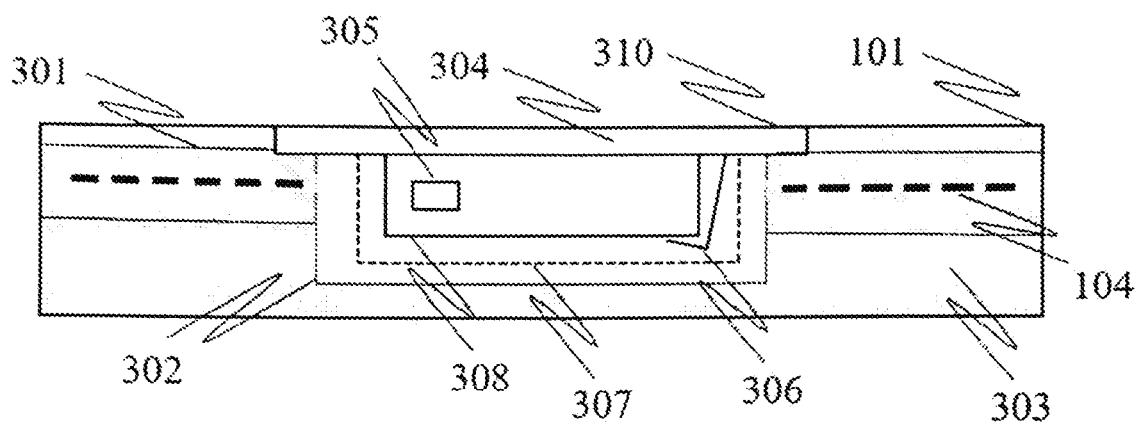
FIG. 3*b* cross-section view illustrates another embodiment of the biometric smart card according to the invention with either the micro-chip module or fingerprint sensor, embedding the microwave frequency-tuned PMIC block, connected to the loop antenna of the card inlay through inductive coupling via its own loop antenna implemented within the top substrate.
Figure 3B:
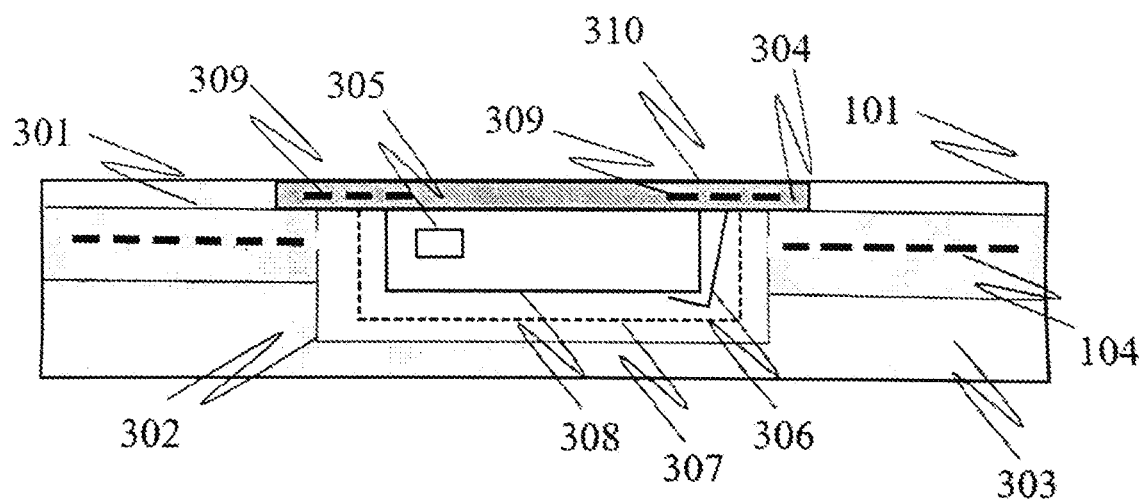
Figure 3C:
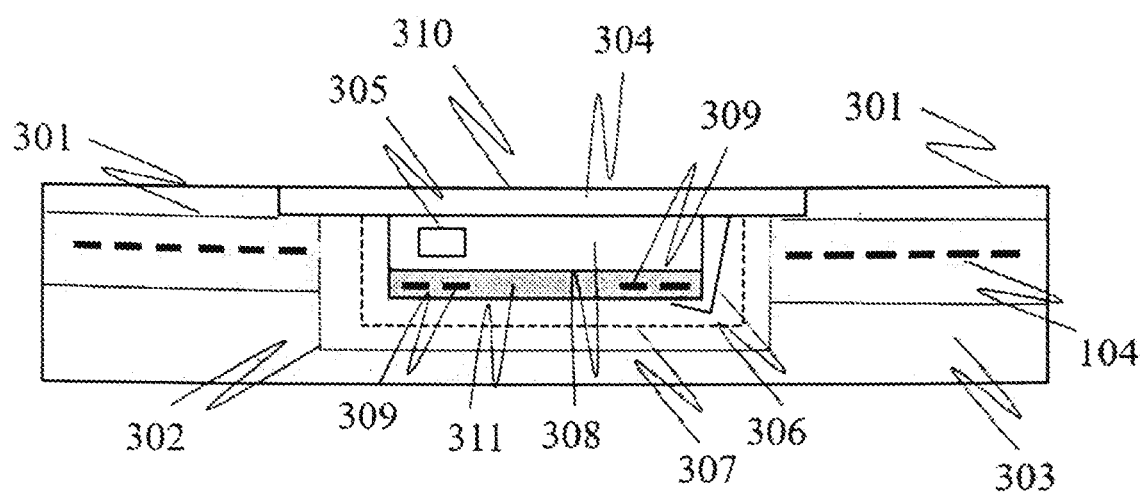
FIG. 3*c* cross-section view shows another embodiment of the biometric smart card according to the invention with either the micro-chip module or fingerprint sensor, embedding the microwave frequency-tuned PMIC block, connected to the loop antenna of the card inlay through inductive coupling via its own loop antenna implemented within the bottom substrate.

In the embodiments of the present invention shown in FIGS. 3*b* and 3*c*, the biometric smart card (101) according to the invention further includes an additional smaller loop antenna (309), either placed within the top substrate (304) or bottom substrate (311) of the active silicon die, thereby connecting the microwave frequency-tuned PMIC block (305) to the larger card inlay (301) loop antenna (104) through inductive coupling.

Although the biometric smart cards illustrated in FIGS. 3*a*, 3*b* and 3*c* respectively show a larger loop antenna within the card inlay, alternate embodiments may not implement such large loop antenna within the card inlay. For instance, and according to non-illustrated embodiments of the present invention, a single smaller loop antenna, either placed within the top substrate or bottom substrate of the active silicon die, can solely be connected to the microwave frequency-tuned PMIC block. As such, numerous modifications and variations of the present invention are possible in light of the above teachings. It is therefore to be understood that within the scope of the appended claims, the invention may be practiced otherwise than as specifically described herein.

Figure 4A:
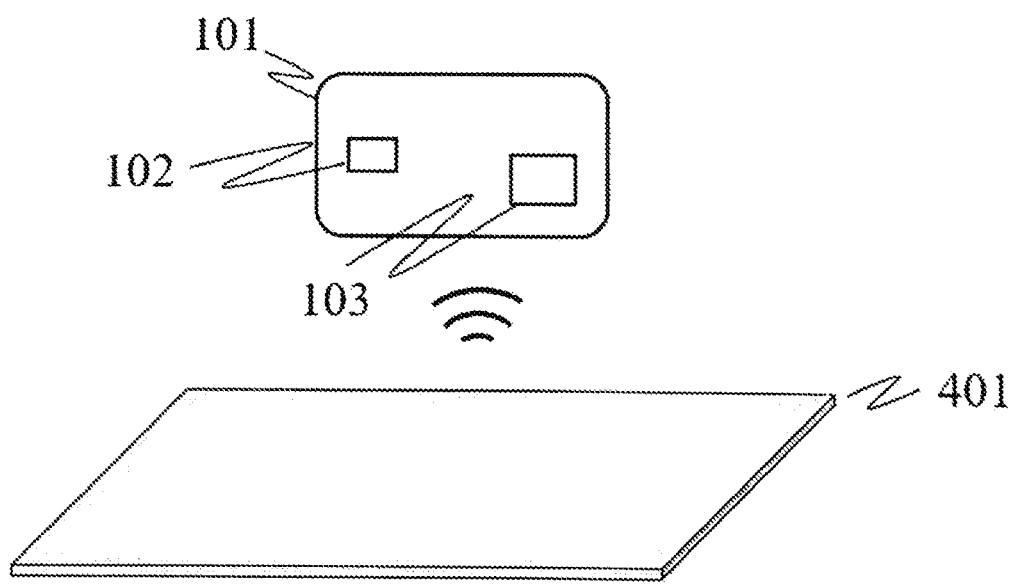
Figure 4B:
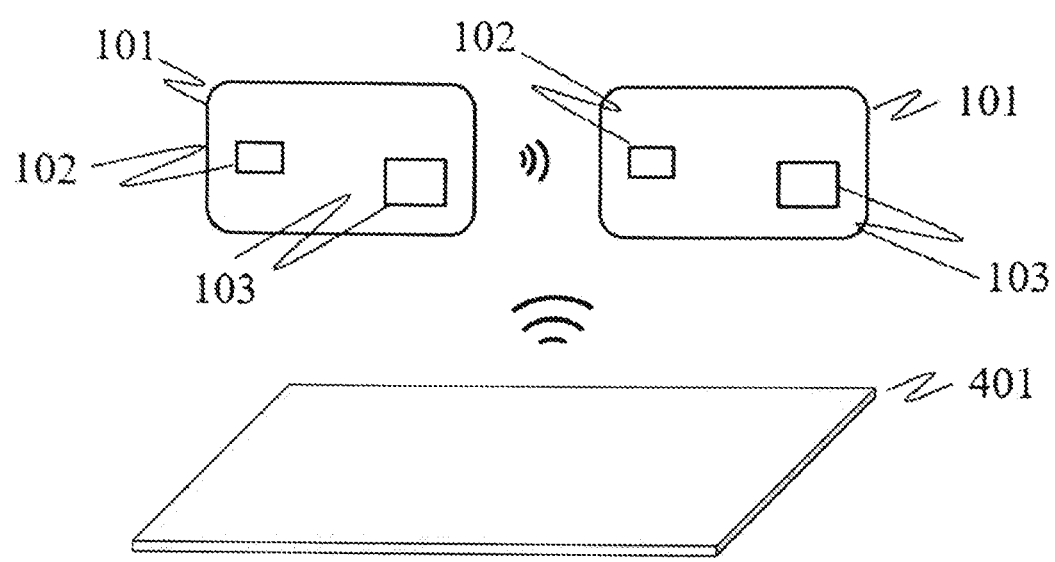

FIG. 4*a* shows the microwave radio-frequency signal (e.g. Bluetooth with de-whitener sequence so as to operate on a fixed frequency, Wi-Fi smartphone mobile hotspot function, Wi-Fi home/office access point, mobile phone frequency signal) emitted by a self-powered communication device (401), such as a cell phone or wireless access point, used to wireless power the biometric smart card (101), equipped with a micro-chip module (102) and fingerprint sensor (103) as described above, during identity self-enrollment phase. FIG. 4*b* shows that same microwave radio-frequency signal emitted by a self-powered communication device (401) used to wireless power two biometric smart cards (101) for data exchange between each other, such as peer-to-peer money transfer (e.g. e-wallets), through inter-backscattering communication.

The invention claimed is:

1. A non-self-powered biometric authentication device comprising a first far-field radio microwave antenna, an antenna tuner, a power rectifier and power converter functions in order to wirelessly power that same authentication device, during an initial identity self-enrollment phase and subsequent data exchanges, through far-field radio waves coming from a nearby self-powered radio frequency device.

2. The non-self-powered biometric authentication device, as recited in claim 1, further comprising a loop antenna tuned to a microwave frequency and further connected to a biometric smart card active silicon integrated circuit through wire connectors.

3. The non-self-powered biometric authentication device, as recited in claim 1, further comprising a second antenna integrated within a biometric smart card active silicon integrated circuit and being inductively-coupled with the first far-field radio microwave antenna.

4. The non-self-powered biometric authentication device, as recited in claim 3, wherein the second antenna is integrated within a top substrate of the biometric smart card active silicon integrated circuit.

5. The non-self-powered biometric authentication device, as recited in claim 3, wherein the second antenna is integrated within a bottom substrate of the biometric smart card active silicon integrated circuit.

6. The non-self-powered biometric authentication device, as recited in claim 3, wherein the second antenna is integrated within a silicon substrate of the biometric smart card active silicon integrated circuit.

* * * * *